US009858823B1

(12) United States Patent
Lynn et al.

(10) Patent No.: US 9,858,823 B1
(45) Date of Patent: Jan. 2, 2018

(54) INTERACTIVE FLIGHT PLAN

(71) Applicants: Benjamin Lynn, Arnold, MD (US); Shimon Weichbrod, Baltimore, MD (US)

(72) Inventors: Benjamin Lynn, Arnold, MD (US); Shimon Weichbrod, Baltimore, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 13 days.

(21) Appl. No.: 14/734,909

(22) Filed: Jun. 9, 2015

(51) Int. Cl.
*G08G 5/00* (2006.01)
*G07C 5/08* (2006.01)

(52) U.S. Cl.
CPC .......... *G08G 5/0034* (2013.01); *G07C 5/085* (2013.01); *G07C 5/0808* (2013.01); *G07C 5/0825* (2013.01); *G07C 5/0833* (2013.01); *G08G 5/0021* (2013.01); *G08G 5/0091* (2013.01)

(58) Field of Classification Search
CPC .... G08G 5/034; G08G 5/0021; G08G 5/0091; G07C 5/0825; G07C 5/0833; G07C 5/085; G07C 5/0808
See application file for complete search history.

(56) References Cited

U.S. PATENT DOCUMENTS

| | | | | |
|---|---|---|---|---|
| 4,642,775 A | * | 2/1987 | Cline | G01C 21/00 701/528 |
| 6,778,906 B1 | * | 8/2004 | Hennings | G05D 1/0061 340/961 |
| 8,723,686 B1 | * | 5/2014 | Murray | G08G 5/0021 340/901 |
| 2009/0306836 A1 | * | 12/2009 | Ausman | G01D 7/00 701/3 |
| 2013/0046422 A1 | * | 2/2013 | Cabos | G08G 5/0034 701/3 |
| 2013/0120166 A1 | * | 5/2013 | Kommuri | G08G 5/0013 340/971 |
| 2015/0262490 A1 | * | 9/2015 | Deker | G08G 5/0052 701/3 |
| 2016/0057032 A1 | * | 2/2016 | Tieftrunk | G01C 21/00 701/533 |
| 2016/0125743 A1 | * | 5/2016 | Shorter, Jr. | G08G 5/0034 701/528 |
| 2016/0217693 A1 | * | 7/2016 | Samuthirapandian | G01C 23/00 |

* cited by examiner

*Primary Examiner* — Thomas Ingram
(74) *Attorney, Agent, or Firm* — Donna P. Suchy; Daniel M. Barbieri (57) ABSTRACT

An interactive record keeping system includes a display system, a user input device, an input-output interface and a controller. The controller is configured to receive user input data indicative of a user display preference and a known waypoint location from the user input device, receive aircraft data indicative of a current aircraft operating parameter and receive environmental data indicative of a current environmental condition, both correlating with the known waypoint location. The controller is further configured to calculate an aircraft performance parameter based on the received aircraft data; generate display data based on the calculated aircraft performance parameter, the received environmental data, and the user display preference; provide the display data to the display system; and store the calculated aircraft performance parameter and the environmental data in a memory.

20 Claims, 7 Drawing Sheets

INTERACTIVE FLIGHT PLAN

BACKGROUND

The inventive concepts disclosed herein relate generally to the fields of flight planning and display systems. More particularly, embodiments of the inventive concepts disclosed herein relate to display systems and methods for acquiring and recording flight navigation and operation information.

Displays are utilized in a wide variety of applications including but not limited to medical, military, avionic, entertainment, and computing applications. In one exemplary application, displays are used in avionics to provide operators of vehicles, such as pilots or navigators, information relating to aviation events, such as aircraft performance, weather conditions, and air traffic control interaction. In some aircraft applications, instead of or in addition to analog dials and gauges, display screens provide the pilot with information about the situation of the aircraft, such as altitude, speed, and directional headings. Displays may also provide the pilot with navigational information, such as weather, no-fly zones, or other aviation events, as well as communications between other aircraft, airports, or other ground-based systems.

An aircraft's flight path is typically determined prior to takeoff, and generally consists of a number of known waypoint locations which the aircraft intends to pass over. When passing over such predetermined waypoint locations, flight crewmembers may manually review displays, dials, and other information sources onboard the aircraft to manually record certain aircraft or environmental data, such as the current time, fuel remaining, speed, procedures flown, temperature, wind speed, and so on. In some instances, prior to reaching a predetermined waypoint location, a pilot or aircraft crew member will estimate expected values for each predetermined waypoint location and then compare the estimated expected values with the recorded actual values to determine if the flight is proceeding as expected. Such data points are typically written by hand using a pen, pencil, or other writing instrument on a flight navigation log book. These hand annotations typically become part of the pilot's or aircraft company's permanent flight log record keeping. The records are often difficult to read, time consuming to perform, and prone to a great degree of human error. Upon landing the aircraft, these hand annotations are typically manually re-entered into a computer system, such as a crew scheduling system, maintenance system, or regulatory compliance database maintained by the aircraft company. Manually re-entering these values that were originally handwritten during flight of the aircraft is also time consuming to perform and prone to a great degree of human error.

A need exists for an interactive record keeping system linked to an avionics system of an aircraft and having a display system to provide and record real-time aircraft operational performance parameters and environmental conditions to pilots or crew members of the aircraft. A further need exists for linking the interactive record keeping system to external record keeping systems to accurately track an aircraft's performance and to comply with record keeping requirements.

SUMMARY

In one aspect, embodiments of the inventive concepts disclosed herein are directed to an interactive record keeping system. The interactive record keeping system includes a display system, a user input device, an input-output interface, and a controller. The user input device is configured to receive a user input. The controller is coupled with the input-output interface and includes at least one processor coupled with a non-transitory processor-readable medium. The controller is configured to receive user input data from the user input device. The user input data is indicative of a user display preference and a known waypoint location. The controller is further configured to receive aircraft data and environmental data from the input-output interface. The aircraft data is indicative of a current aircraft operating parameter and the environmental data is indicative of a current environmental condition, and the aircraft data and the environmental data correlate with the known waypoint location. The controller is further configured to calculate an aircraft performance parameter based on the received aircraft data, and generate display data based on the calculated aircraft performance parameter, the received environmental data, and the user display preference. The display data is indicative of the current environmental condition and the aircraft performance parameter for the known waypoint location. The controller is further configured to provide the display data to the display system, and store the calculated aircraft performance parameter and the environmental data in a memory.

In a further aspect, embodiments of the inventive concepts disclosed herein are directed to a method. The method includes receiving user input data from a user input device, the user input data indicative of a user display preference and a known waypoint location; receiving aircraft data and environmental data from an input-output interface, the aircraft data indicative of a current aircraft operating parameter and the environmental data indicative of a current environmental condition, wherein the aircraft data and the environmental data correlate with the known waypoint location; calculating an aircraft performance parameter based on the received aircraft data; generating display data based on the calculated aircraft performance parameter, the received environmental data, and the user display preference, the display data indicative of the current environmental condition and the aircraft performance parameter for the known waypoint location; providing the display data to a display system; and storing the calculated aircraft performance parameter and the environmental data in a memory.

In another aspect, embodiments of the inventive concepts disclosed herein are directed to a flight planning system. The flight planning system includes a touchscreen display, an input-output interface, and a controller. The touchscreen display is configured to display data and receive a user input. The controller is coupled with the input-output interface and includes at least one processor coupled with a non-transitory processor-readable medium. The controller is configured to receive user input data from the touchscreen display. The user input data is indicative of a user display preference and a known waypoint location. The controller is further configured to receive aircraft data and environmental data from the input-output interface. The aircraft data is indicative of a current aircraft operating parameter and the environmental data is indicative of a current environmental condition, and the aircraft data and the environmental data correlate with the known waypoint location. The controller is further configured to calculate an aircraft performance parameter based on the received aircraft data, and generate display data based on the calculated aircraft performance parameter, the received environmental data, and the user display preference. The display data is indicative of the current environmental condition and the aircraft performance parameter for the known waypoint location. The controller is further configured to generate an alert based on at least one of the calculated aircraft performance parameter and the environmental condition, provide the display data to the touchscreen display, and provide the alert in a cockpit of an aircraft. The alert provides an indication to a pilot of the aircraft to take an action. The controller is further configured to store the calculated aircraft performance parameter and the environmental data in a memory.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Before turning to the figures, which illustrate exemplary embodiments of the inventive concepts disclosed herein in detail, it should be understood that the inventive concepts are not limited to the details or methodology set forth in the description or illustrated in the figures. It should also be understood that the terminology is for the purpose of description only and should not be regarded as limiting. As discussed below, systems and methods contemplated herein are configured to enhance the accuracy of obtaining and recording aircraft operational performance parameters and environmental conditions, to improve the performance of aircraft pilots and crew members, decrease pilot and crew workloads, simplify post-flight data dissemination to internal and external systems, and to automate corporate and regulatory record keeping requirements for aircraft operators and their owners. The systems and methods according to the inventive concepts disclosed herein may be utilized in a number of display devices for various types of applications or sensing systems. In some embodiments, systems and methods as described herein may be used for a flight display of an aircraft. According to various exemplary embodiments, systems and methods of the present disclosure may be used by any system in any other embodiment for rendering computer graphics and displaying an output (e.g., in another aircraft, spacecraft, a ground-based vehicle).

Figure 1:
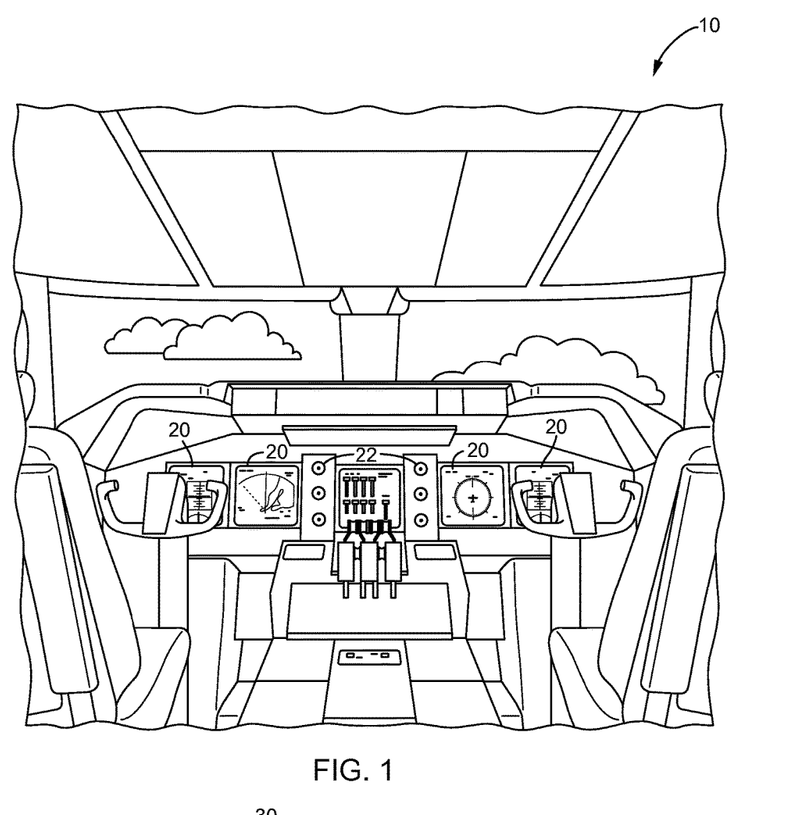
FIG. 1 is a perspective view schematic illustration of an aircraft control center or cockpit, accordingly to an exemplary embodiment.

Referring to FIG. 1, an exemplary aircraft control center or cockpit 10 for an aircraft is shown. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation ("NAV") displays, primary flight displays, electronic flight bag displays, tablets such as iPad® computers manufactured by Apple, Inc. or tablet computers, synthetic vision system displays, head up displays ("HUDs") with or without a projector, wearable displays, watches, Google Glass® and so on. The flight displays 20 may be used to provide information to the flight crew, thereby increasing the flight crew's visual range and enhancing their decision-making abilities. The flight displays 20 may be configured to function as, for example, a primary flight display ("PFD") used to display altitude, airspeed, vertical speed, and navigation and traffic collision avoidance system ("TCAS") advisories. The flight displays 20 may also be configured to function as, for example, a multi-function display used to display navigation maps, weather radar, electronic charts, TCAS traffic, aircraft maintenance data and electronic checklists, manuals, and procedures. The flight displays 20 may also be configured to function as, for example, an engine indicating and crew-alerting system ("EICAS") display used to display critical engine and system status data. Other types and functions of the flight displays 20 are contemplated and will be apparent to those skilled in the art. According to various exemplary embodiments, at least one of the flight displays 20 may be configured to provide a rendered display from the systems and methods of the present disclosure.

In some embodiments, the flight displays 20 may provide an output from an aircraft-based system, a ground-based system, a satellite-based system, or from a system of another aircraft. For example, in one embodiment, the flight displays 20 provide an output from a ground-based weather radar system. In some embodiments, the flight displays 20 provide an output from an aircraft-based weather radar system, LIDAR system, infrared system or other system on the aircraft. For example, the flight displays 20 may include an avionics display, a joint display, an air traffic display, a weather radar map, and a terrain display. The flight displays 20 may include an electronic display or a synthetic vision system ("SVS"). For example, the flight displays 20 may include a display configured to display a two-dimensional ("2-D") image, a three-dimensional ("3-D") perspective image of air traffic data, terrain, and/or weather information, or a four-dimensional ("4-D") display of weather information or forecast information. Other views of air traffic information, terrain, and/or weather information may also be provided (e.g., plan view, horizontal view, and vertical view). The views shown on the flight displays 20 may include monochrome or color graphical representations of the displayed information. Graphical representations of the displayed information may include an indication of altitude of other aircraft, weather conditions, or terrain, or the altitude and/or location of such information relative to the aircraft.

The UI elements 22 may include, for example, dials, switches, buttons, touch screens, keyboards, a mouse, joysticks, cursor control devices ("CCDs") or other multi-function key pads certified for use with avionics systems, and so on. The UI elements 22 may be configured to, for example, allow an aircraft crew member to interact with various avionics applications and perform functions such as data entry, manipulation of navigational maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew member to adjust the brightness, contrast, and information displayed on the flight displays 20. The UI elements 22 may additionally be used to acknowledge or dismiss an indicator provided by the flight displays 20. Further, the UI elements 22 may be used to correct errors on the flight displays 20. Other UI elements 22, such as indicator lights, displays, display elements, and audio alerting devices, may be configured to warn of potentially threatening conditions such as severe weather, terrain, obstacles.

Figure 2:
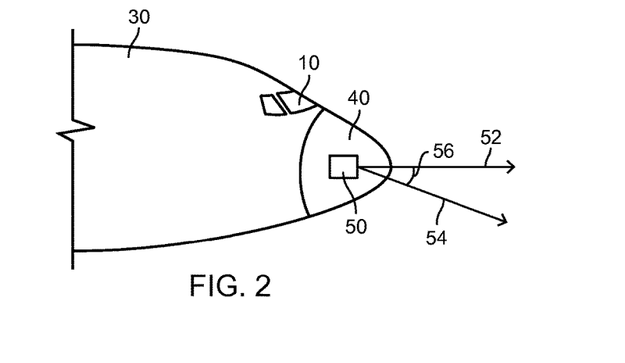
FIG. 2 is a side view schematic illustration of the front or nose of an aircraft with an aircraft control center or cockpit, according to an exemplary embodiment.

Referring now to FIG. 2, a side-view of an exemplary aircraft 30 including the aircraft control center 10 and a nose 40 having a radar system 50 is shown. The radar system 50, such as a weather radar system or other radar system, is generally located inside the nose 40 of the aircraft 30 or may be located inside the control center or cockpit 10 of the aircraft 30. According to other exemplary embodiments, the radar system 50 may be located anywhere on the aircraft 30, such as on the top of the aircraft 30 or on the tail of the aircraft 30. The various components of the radar system 50 may be distributed at multiple locations throughout the aircraft 30. The radar system 50 may include or may be coupled to an antenna system of the aircraft 30. The radar system 50 or other equipment aboard the aircraft 30 may be configured to receive information from other sources, for example, from satellite systems, other aircraft, and/or ground-based stations. For example, the radar system 50 may be configured to receive information from ground-based weather radar systems. The radar system 50 may be any radar system configured to detect or receive data for the systems and methods of the present disclosure. According to exemplary embodiments, the radar system 50 may be an RTA-4218 MULTISCAN radar system, a WXR-2100 MULTISCAN radar system, or similar system manufactured by Rockwell Collins and configured in accordance with the principles described herein.

The radar system 50 may generally work by sweeping a radar beam horizontally back and forth across the sky. For example, the radar system 50 may conduct a first horizontal sweep 52 directly in front of the aircraft 30 and a second horizontal sweep 54 downward at a tilt angle 56 (e.g., 20 degrees down). Returns from different tilt angles may be electronically merged to form a composite image for display on an electronic display, such as the flight displays 20 in the aircraft control center or cockpit 10. Returns may also be processed to, for example, distinguish among other aircraft, terrain, weather, and other objects, to determine the height of the terrain, to determine the height of the weather, to determine the height of the other objects, and so on.

The radar system 50 may also sweep a radar beam vertically back and forth. Results from the different vertical tilt angles may be analyzed to determine the characteristics of weather. For example, the altitude, range, and vertical height of weather may be determined using the vertical scan results. These results may be used to form an image for display on the flight displays 20 or on other electronic displays. For example, a vertical profile view of the weather may be generated. The profile may be used by a pilot to determine height, range, hazards and threats, and other relevant information that may be utilized by an aircraft crew member to change the course of the aircraft 30 to avoid the detected weather condition.

Figure 3:
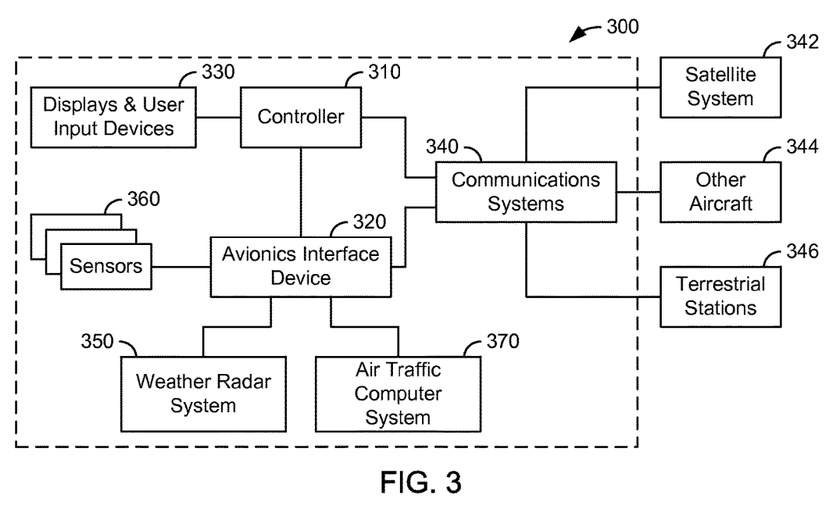
FIG. 3 is a block diagram of an interactive record keeping system including a controller, according to an exemplary embodiment.

Referring now to FIG. 3, a block diagram of an interactive record keeping system 300 is shown, according to an exemplary embodiment. The interactive record keeping system 300 includes a controller 310 including a communications interface, an avionics interface device 320, displays and user input devices 330, a communications systems 340, a weather radar system 350, sensors 360, and an air traffic computer system 370. The displays and user input devices 330 may be installed or located in an aircraft control center 10. For example, the displays and user input devices 330 may include a single device for displaying information and receiving an input (e.g., a touchpad) or may include separate devices for displaying information and receiving an input (e.g., an LCD screen and a keyboard), and may be or include electronic displays and input devices of any nature, such as the flight displays 20 and the UI elements 22.

The avionics interface device 320 may be a network interface configured to send data to, receive data from, or otherwise facilitate electronic data communications with aircraft-based systems, satellite-based systems, or ground-based systems. The avionics interface device 320 may interface with or be a flight management system, aircraft control system, aircraft monitoring system, or the like. In one example, the avionics interface device 320 may facilitate communications with the controller 310, the sensors 360, the weather radar system 350, the air traffic computer system 370, and the communications systems 340. The avionics interface device 320 may include wired or wireless interfaces (e.g., jacks, antennas, transmitters, receivers, transceivers, wire terminals) for conducting data communications with various systems, devices, or networks. For example, the avionics interface device 320 may include an Ethernet card and port for sending and receiving data via an Ethernet-based communications network and/or a WiFi transceiver for communicating via a wireless communications network. In some embodiments, the avionics interface device 320 may be configured to communicate via local area networks or wide area networks and may use a variety of communications protocols. In some embodiments, the avionics interface device 320 may include components of ground-based systems or components of aircraft-based systems. For example, the avionics interface device 320 may include the controller 310, the sensors 360, and the communications systems 340.

In some embodiments, the communications systems 340 facilitates communications between the avionics interface device 320 and a satellite system 342, other aircraft 344, a terrestrial stations 346, or other air, space, or ground-based systems. For example, the communications systems 340 may send data to and receive data from external ground-based weather supplier systems and ground-based air traffic control systems. The communications systems 340 may be configured to communicate with systems external to the aircraft using any number of systems or methods. In some embodiments, the communications systems 340 sends and receives data over a mobile network. The communications systems 340 may utilize various types of channels to communicate, including virtual channels, radio channels, satellite channels, and so on. The channels may be bi-directional or uni-directional and may be satellite link channels, VHF channels, INMARSAT channels, and so on. Any type of wireless communications may be utilized. Various types of communication protocols, including network and ad hoc network protocols may be used to perform communication operations and establish channels to facilitate communications. In some embodiments, aircraft-based systems may communicate with ground-based systems through short-range wireless communication systems 340 or wired interfaces (e.g., when the aircraft is parked at a terminal or otherwise grounded).

In some embodiments, the communications systems 340 may be configured to transmit, upload, or otherwise output data to an external system, such as the terrestrial stations 346. In some embodiments, the communications systems 340 continuously maintain a data transfer connection with an external system. In some embodiments, the communications systems 340 initiates a data transfer connection with an external system only when in range, or only during or after a certain event, such as a user instructing the communications systems 340 to initiate a data transfer, the aircraft landing at an airport, the aircraft coming to a stop, the aircraft docking at an airport terminal, or the aircraft pulling into an aircraft hangar.

In some embodiments, the sensors 360 may include, one or more fuel sensors, airspeed sensors, location tracking sensors (e.g., GPS), lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, or any other aircraft sensors or sensing systems that may be used to monitor the performance of an aircraft or weather local to or remote from the aircraft. The sensors 360 may be located in various positions on an aircraft, and a single sensor may be configured to acquire more than one types of sensor data. Data from the sensors 360 may be output to the controller 310 for further processing and display, or for transmission to a terrestrial station (e.g., a ground-based weather radar system, air traffic control services system, or other terrestrial station) or to other aircraft via the communications systems 340. Data collected from ground-based systems may also be processed by the controller 310 to process, analyze, and configure the collected data for display.

The weather radar system 350 may be a system for detecting weather patterns. Detected weather patterns may be communicated to the displays and user input devices 330 (e.g., via the avionics interface device 320, the communications interface 314, and/or the display module 384) for display to the flight crew. In addition, data from the weather radar system 350, or the terrestrial stations 346, may be received by the controller 310 and then displayed on the displays and user input devices 330 (e.g., via the communications interface 314, the avionics interface device 320, and/or the display module 384). In some embodiments, the controller generates display data based on received environmental data, which may be indicative of a current environmental condition near the aircraft 30. For example, upon passing through a waypoint location, the weather radar system 350 may acquire temperature and/or wind speed readings, the controller may receive the temperature and/or wind speed readings from the weather radar system, and then the controller may generate weather radar data (e.g., via the weather radar module 382 and/or the display module 384) indicative of the current temperate and/or wind speed to display to the aircraft crew. Detected weather patterns may instead or may also be provided to electronics, such as the avionics interface device 320 and/or the controller 310, for further analysis or transmission to the terrestrial stations 346 or to the other aircraft 344 via the communications systems 340.

The air traffic computer system 370 may be configured to communicate with the avionics interface device 320. In some embodiments, the air traffic computer system 370 may be a navigation system. In some embodiments, the air traffic computer system 370 may communicate with external systems, such as terrestrial stations 346, via the communications systems 340 through, for example, the ACARS network. In some embodiments, the communications systems 340 may enable two-way communication between the avionics interface device 320 and all services available on the ACARS network, including PreDeparture Clearance ("PDC"), Digital Airport Terminal Information Services ("D-ATIS"), weather products and a host of messaging destinations including email, SMS, group messaging, fax and aviation ground networking addresses (e.g., Aeronautical Fixed Telecommunications Network "AFTN" and ARINC Data Network Service "ADNS"), among others.

Figure 4:
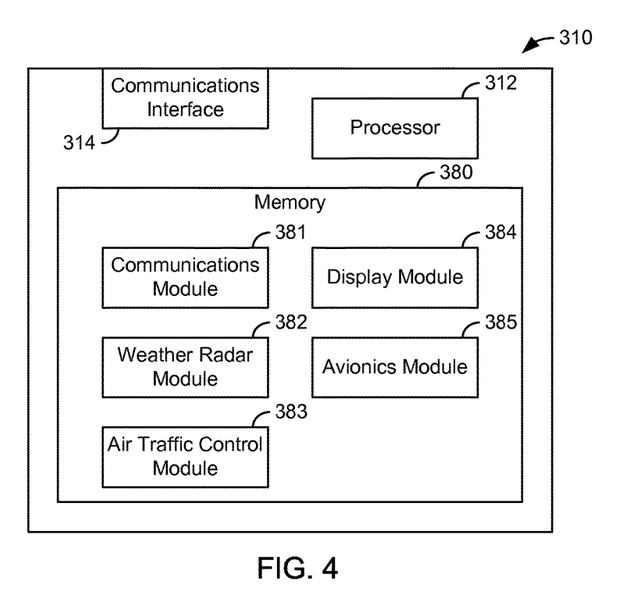
FIG. 4 is a block diagram of the controller of the interactive record keeping system, according to an exemplary embodiment.

Referring now to FIG. 4, a detailed block diagram of an exemplary embodiment of the controller 310 is shown. The controller 310 includes a processor 312, a communications interface 314, and a memory 380. The communications interface 314 is configured to facilitate communications with other components of the interactive record keeping system 300. The processor 312 may be coupled with the memory 380, which may comprise a non-transitory processor-readable medium storing processor-executable code and/or data. The processor 312 may be implemented as a specific purpose processor, an application specific integrated circuit ("ASIC"), one or more field programmable gate arrays ("FPGAs"), a group of processing components, or other suitable electronic processing components. Any controllers and modules described herein may be implemented as a hardware circuit comprising custom VLSI circuits or gate arrays, off-the-shelf semiconductors such as logic chips, transistors, or other discrete components, and may be implemented in programmable hardware devices such as field programmable gate arrays, programmable array logic, programmable logic devices or the like. The memory 380 is one or more devices (e.g., RAM, ROM, flash memory, hard disk storage) for storing data and/or computer code for completing and/or facilitating the various user or client processes, layers, and modules described in the present disclosure. The memory 380 may be or include volatile memory or non-volatile memory and may include database components, object code components, script components, or any other type of information structure for supporting the various activities and information structures of the present disclosure. The memory 380 is communicably connected to the processor 312 and includes computer code or instruction modules for executing one or more processes described herein.

The communications interface 314 may facilitate communications with other components of the interactive record keeping system 100. For example, the communications interface 314 may facilitate communications with the communications systems 340, avionics interface device 320, and displays and user input devices 330. The communications interface 314 may be configured to receive sensor input from the sensors 360, and to communicate information to and from the displays and user input devices 330 via a wired or wireless connection. The communications interface 314 may include any type of wired or wireless technology for facilitating communications, including electronic and optical communication protocols.

The memory 380 is shown to include various modules for determining properties related to interactive record keeping, including a communications module 381, a weather radar module 382, an air traffic control module 383, a display module 384, and an avionics module 385. The communications module 381 may be configured to control the communications systems 340, for example, to send and/or receive data via the satellite system 342, the other aircraft 344, or the terrestrial stations 346 based on a user input received from the displays and user input devices 330. The weather radar module 382 may be configured to control the weather radar system 350 via a user input received from the displays and user input devices 330, for example, to cast one or more radar beams from an aircraft-mounted antenna, to receive returns, and to interpret the returns for display to the aircraft crew. In some embodiments, the weather radar system 350 may be controlled via an external weather radar system, such as one located on the terrestrial station 346. The air traffic control module 383 may be configured to control the air traffic computer system 370, for example, to send and/or receive data to or from a ground-based air traffic control station via the communications systems 340. The display module 384 may be configured to generate display data and provide the display data to a display system.

In some embodiments, the avionics module 385 is configured to communicate with other components of the interactive record keeping system 300 via the avionics interface device 320 and/or the communications systems 340 to acquire, gather, generate, analyze, process, or otherwise configure data for being displayed on the displays and user input devices 330. In some embodiments, the data is displayed in real time. The avionics module 385 may be configured to receive, process, and/or analyze data acquired by the sensors 360 and/or the avionics interface device 320. For example, data may be acquired by at least one of ACARS, a mobile network, via ARINC 429 and/or ARINC 717 standards, an internal GPS system, an external GPS system, a propriety data acquisition unit, such as a proprietary flight management system developed by Rockwell Collins or other supplier of avionic equipment. For example, the acquired data may include data indicative of at least one of a planned route of flight, an actual route of flight, an estimated time over points (e.g., predetermined waypoint locations), an actual time over points, a fuel burn amount, a fuel burn rate, information received via ACARS (e.g., ON, OFF, OUT, IN ("OOOI") events, fuel on board information), information received via ARINC standards, such as the ARINC 429 and/or ARINC 717 standards (e.g., information indicative of the aircraft's position, altitude, speed, direction, fuel remaining, fuel flow, wind and/or temperature data, current aircraft weight), aircraft position, altitude, speed, direction, heading, and so on.

In some embodiments, the avionics module 385 may be configured to receive, process, and/or analyze data manually inputted, for example, by the pilot or crew members of the aircraft using the displays and user input devices 330. Manually inputted data may include at least one of actual time over points, actual time over predetermined waypoint locations, actual fuel remaining, fuel burn rates, and so on. In some embodiments, the displays and user input devices 330 may be configured to initially display a calculated aircraft performance parameter and a received environmental condition, but the pilot or aircraft crew member may manually override the interactive record keeping system 300 to display a different value, such an actual value. In some embodiments, all displayed aircraft performance parameters and environmental conditions are manually input by a pilot or aircraft crew member (e.g., the interactive record keeping system 300 may not include an avionics system or sensors to acquire data). In some embodiments, some data may be pre-populated using values from a flight plan, and these pre-populated values may then be manually adjusted by the flight crew to reflect actual values once the aircraft reaches a specific location, such as the waypoint location. For example, upon passing through a waypoint location at four o'clock and noticing that the display shows the time over the point as being five o'clock (e.g., due to a daylight savings adjustment error, time zone calculation error), the pilot may provide a manual input that changes the time over the point to four o'clock. In this way, the displayed data may be viewed, confirmed, and, if necessary, adjusted by the pilot or flight crew to ensure the data is accurate. In some embodiments, the displayed data must be validated by the pilot or an aircraft crew member. For example, in some embodiments, a popup or an alert may provide the pilot or crew member an indication that they should manually confirm that the displayed data is accurate. In some embodiments, the display indicates whether or not the data's accuracy must be, has been, or has not yet been confirmed. The waypoint locations may be predetermined prior to take off and input using the displays and user input devices 330. In some embodiments, the waypoint location may be a compulsory reporting point.

In some embodiments, the interactive record keeping system 300 is configured to determine and record aircraft operation parameters relating to maintenance and scheduling. For example, the interactive record keeping system 300 may be configured to track, for a specific aircraft, block time, flight time, block fuel, a power on time, flap settings, a procedure flown, a type of landing (e.g., landings using an Instrument Landing System, visual approach landings, landings using GPS), a power setting, and so on. The interactive record keeping system 300 may be configured to use the acquired data and/or the determined data to alert a user of various levels of deviations (e.g., minor or significant deviations) from the flight plan or other important information, including deviations in estimated arrival time (e.g., either determined by the controller 310 or manually set by a user), if a fuel amount at a waypoint location is projected to be insufficient to reach a final destination, if a fuel amount at a final destination is projected to be below a requested or required fuel amount (e.g., a required reserve fuel amount), and whether the fuel remaining is insufficient for potential alternate routes. In some embodiments, the interactive record keeping system 300 may be configured to perform Reduced Vertical Separation Minima ("RVSM") altimeter checks. In some embodiments, the interactive record keeping system 300 may be configured to display an Equal Time Point ("ETP") location (e.g., ETP airports) based on the aircraft's current position along a route, an Extended-range Twin-engine Operational Performance Standards ("ETOPS") area of operation, an entry and/or exit point for the ETOPS area, a compulsory reporting point (e.g., indicated as a waypoint location).

In some embodiments, the interactive record keeping system 300 may be configured to use flight performance information to evaluate planned versus actual data. In some embodiments, the interactive record keeping system 300 may be configured to determine trends relating to the planned and/or actual data. In some embodiments, the interactive record keeping system 300 may be configured to determine more efficient flight plans based on the actual aircraft performance data. For example, upon a pilot entering a flight plan into the interactive record keeping system 300, the system may determine that the entered data is likely to be inaccurate based on actual data previously acquired during prior flights. For example, the pilot may plan a flight with a fuel amount to be 10,000 pounds, and the interactive record keeping system 300 may determine that the aircraft is likely to require 10,500 pounds of fuel for the flight based on the aircraft having needed 10,500 pounds of fuel during a previous flight of the same route in similar weather conditions. Other factors, such as plane age, type of fuel used, estimated and actual temperature conditions, and so on, may be considered when determining a trend or pattern, or in determining an optimal flight route (e.g., most fuel efficient, least amount of turbulence, quickest flight route, shortest flight route).

Figure 5:
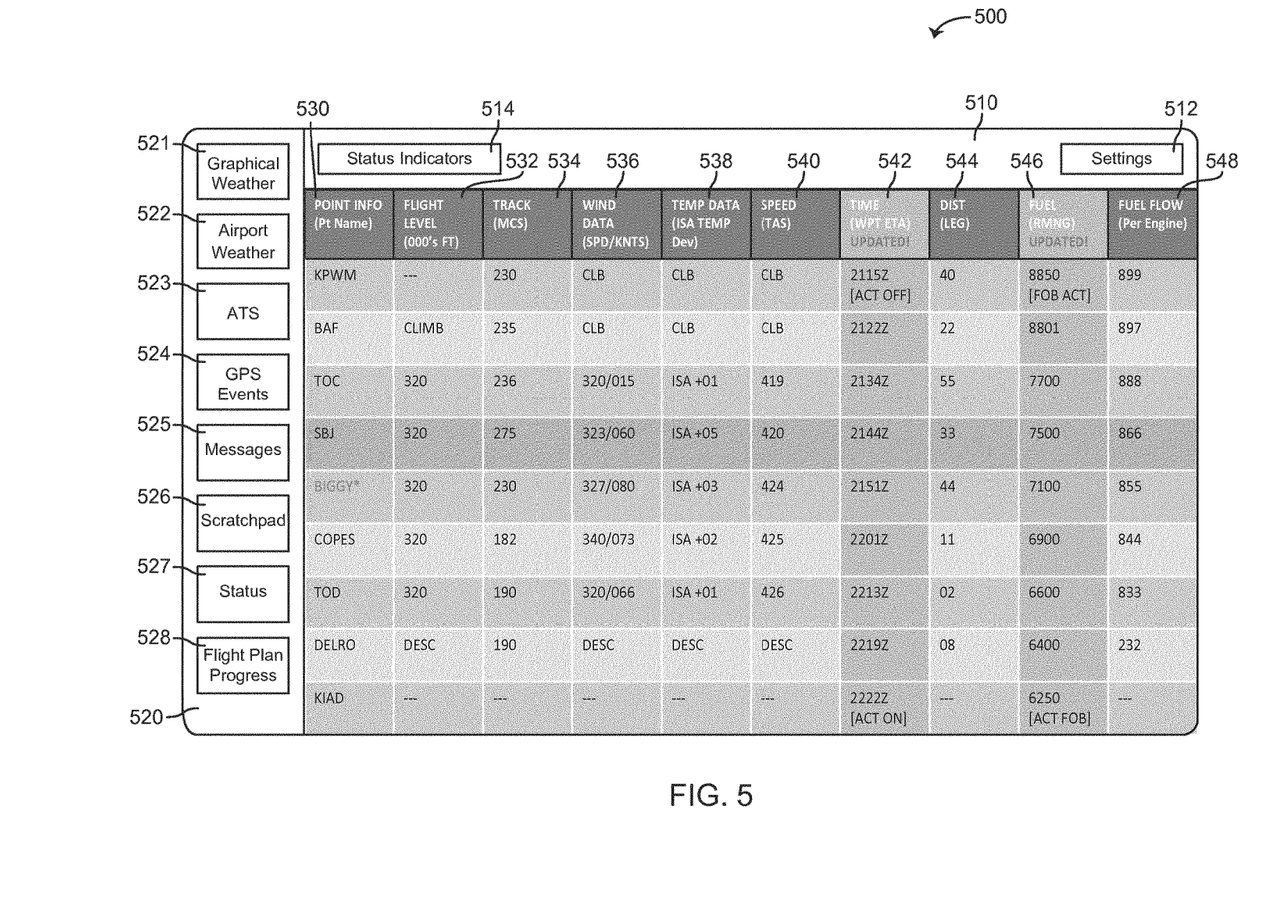
FIG. 5 is an illustration of a display screen of the interactive record keeping system, according to an exemplary embodiment.

Referring now to FIG. 5, an illustration of an exemplary embodiment of a display screen 500 of the interactive record keeping system 300 is shown. The display screen 500 is configured for selectively displaying a variety of data, including aircraft data and environmental data. The display screen 500 is configured to be displayed on an electronic display, such as the flight displays 20 and the UI elements 22 in the aircraft control center 10. The display screen 500 may include information in various forms, for example, by way of a display status bar 510 and a display option bar 520. In some embodiments, the display status bar 510 and the display option bar 520 may normally be hidden and only displayed upon user configuration using UI elements 22, user configuration using the display screen 500 (e.g., though a touch screen interface), or upon an alert or event occurring. For example, in one embodiment, the display status bar 510 is normally hidden but is displayed along with an alert sound, light, and/or vibration upon approaching a waypoint location.

In some embodiments, the display screen 500 may be configured to display various types of information by way of option indicators displayed on the display status bar 510, such as a settings indicator 512 and status indicators 514. When selected, the settings indicator 512 may provide a user with options to customize the display screen 500. For example, a user may make selections regarding screen brightness, contrast, refresh rate, and color scheme, among other options. When selected, the status indicator 514 may display information relating to the status of the interactive record keeping system 300, including information relating to the connection between the communications systems 340 and a ground-based terrestrial station 346, connectivity alerts, and system maintenance information, among other status information. Other options may also be provided, for example, enabling the layering of aviation data, the ability to turn various features "on" or "off" (e.g., displayed or not displayed, overlaid or not overlaid, and so on) and an ability to request various graphical products, such as a graphical weather product, an air traffic control product, a navigation product, and so on.

In some embodiments, the display screen 500 may include the display option bar 520. In one embodiment, the display option bar 520 includes a plurality of display options and communication features related to aircraft flight, navigation, record keeping, and safety. For example, in one embodiment, a user may have options to display and/or request information by way of indicators for displaying graphical weather 521, airport weather 522, airport terminal services ("ATS") 523, and GPS events 524, among others. A user may also have options to access and display other features as well, for example, by way of an indicator for displaying messages 525 to communicate with other aircraft or ground-based systems, a scratchpad 526 for note taking or other functions, and an indicator for displaying status 527 information detailing, for example, flight information or forecasted weather, among other options as further described below. In some embodiments, the display option bar 520 may further include a flight plan progress feature 528 for displaying aircraft operating parameters, environmental data, or other flight log data.

In some embodiments, the flight plan progress feature 528 may display information, such as aircraft operating parameters, environmental data, or other flight log data in a tabular form as depicted in FIG. 5 on the display screen 500. As shown, the information may be organized into columns and rows. In some embodiments, column headings indicating the type of information displayed in each column may be horizontally disposed across a top portion of the display screen 500, and row headings indicating waypoint locations may be vertically disposed across a left portion of the display screen 500. It will be appreciated that the information may be displayed in various ways and in differing orders, and may include additional types of information or less types of information than those which are shown in FIG. 5 and discussed herein. For example, the column heading may be located along a bottom portion of the display screen 500 or along a middle portion of the display screen 500. The row headings may be displayed along a different portion of the screen as well. In some embodiments, the column and row headings may be hidden or not shown, or temporarily hidden or temporarily not shown. It will further be appreciated that the row headings may comprise different types of information, such as an array of waypoint locations, an array of flight times, and/or an array of flight distance.

As shown in FIG. 5, a variety of display information may be displayed on the display screen 500, including display information categories relating to point information 530, a flight level 532, a track 534, wind data 536, temperature data 538, a speed 540, a time 542, a distance 544, a fuel 546, and/or fuel flow 548. In some embodiments, a pilot or aircraft crew member may customize the display information so that particular information is displayed for each display information category. In some embodiments, multiple information types for each display information category may be displayed. For example, the point information 530 may relate to or be in the form of a waypoint name indicator, a latitude and longitude of the point, a very high frequency omnidirectional range ("VOR") name and/or a frequency, and/or a flight information region ("FIR") (e.g., Chicago Center FIR, Boston Center FIR). For example, the flight level 532 may relate to or be in the form of altitude measured in meters and/or feet, a tropopause height (i.e., jet stream height), a minimum off route altitude ("MORA") and/or a minimum safe altitude ("MSA"). For example, the track 534 may indicate a direction the aircraft is facing, and may be in the form of a magnetic course, an average magnetic heading, a magnetic heading, a true course, and/or an airway, a sid/star indicator, or a direct route. For example, the wind data 536 may relate to or be in the form of a wind speed and/or direction, a cross wind component, and/or a wind shear. For example, the temperature data 538 may relate to or be in the form of an outside air temperature and/or an indicated standard atmosphere temperature deviation. For example, the speed 540 may relate to or be in the form of a true air speed, an indicated air speed, a ground speed, and/or a Mach number (e.g., Mach 0.8, Mach 2). For example, the time 542 may relate to or be in the form of a leg time (i.e., time between a first waypoint location and a second waypoint location), an accumulated time indicative of the total amount of time flying (i.e., a sum of all leg times), a time remaining (e.g., time remaining until a next waypoint location, time remaining until the final destination), a waypoint estimated time of arrival ("WPT ETA"), and/or an actual time over the waypoint location. For example, the distance 544 may relate to or be in the form of a leg distance (i.e., distance between a first waypoint location and a second waypoint location), an accumulated distance indicative of the total distance flown (i.e., a sum of all leg distances), and/or a distance remaining (e.g., distance remaining until a next waypoint location, distance remaining until the final destination). For example, the fuel 546 may relate to or be in the form of a leg burn (i.e., fuel burned between a first waypoint location and a second waypoint location), an accumulated fuel burn indicative of the total fuel burnt during the current flight (i.e., a sum of all leg burns), an actual fuel remaining on board the aircraft, an actual burn remaining (e.g., how much fuel needs to be burned to reach the final destination), and/or a minimum required fuel amount (e.g., how much fuel the aircraft is required to land with, for example, required reserve per regulations). The minimum required fuel amount may include the actual burn remaining plus an amount of required reserve fuel. For example, the fuel flow 548 may relate to or be in the form of a fuel flow per engine (e.g., the fuel burn rate per engine per hour at a given waypoint location), a total fuel flow (e.g., fuel flow multiplied by the number of engines), and an aircraft gross weight (e.g., the weight of the aircraft plus the weight of the remaining fuel). A category may further be included for leg remarks (e.g., notes automatically generated or manually entered by the pilot in relation to a particular leg between waypoint locations).

In some embodiments, multiple information types for each display information category may be displayed. For example, a user may customize the display screen 500 to display several types or forms of point information 530, several types or forms of wind data 536, several types or forms of speed data, and so on. In some embodiments, columns and rows of information may be dragged and dropped as the result of a user input. In some embodiments, certain information that a particular pilot prefers to be displayed may be saved and later loaded so that the particular pilot does not have to reconfigure and/or again customize display setting for each planned flight. For example, a user may decide to display several types of point information 530, such as a waypoint name indicator relating to an airport (e.g., MCI, MKE, KPWM, BAF) and the latitude and longitude coordinates for the waypoint name indicator. In some embodiments, data columns, rows, or individual cells may be highlighted, configured to flash, change color, change text, or otherwise be differentiated from other data when being populated and/or updated. In some embodiments, the data may be highlighted when being updated and may only return to normal once a pilot or aircraft crew member taps on the highlighted data to confirm the highlighted data's accuracy.

Figure 6:
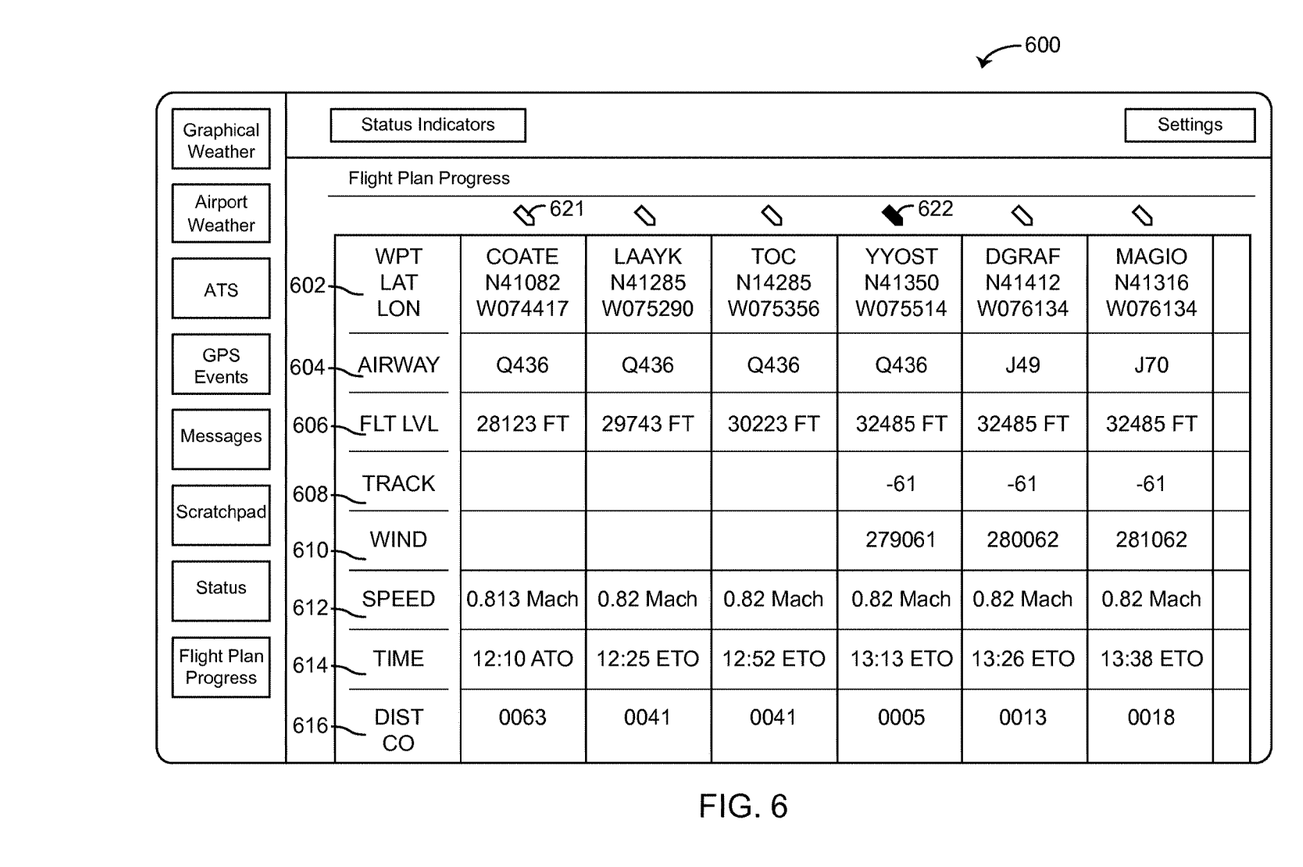
FIG. 6 is an illustration of a display screen of the interactive record keeping system, according to an exemplary embodiment.

Referring now to FIG. 6, an illustration of a display screen 600 of the interactive record keeping system 300 is shown, according to another exemplary embodiment. As shown, a table having waypoint information 602, including a waypoint identifier and a latitude and longitude of a waypoint location, is disposed horizontally along a top portion of the display screen 600, and a variety of display information is vertically disposed along a left portion of the display screen 600. The display information includes, for each waypoint information 602, indicators for displaying an airway 604, a flight level 606, a track 608, a speed 612, a time 614, and a distance 616. As shown, the time 614 may indicate an actual time over ("ATO") the waypoint location and/or an estimated time over ("ETO") the waypoint location. The display screen 600 may further include icons 621, 622 for selecting a column of data (e.g., to edit the data, delete the data, deselect the data for display, to select a different type of data or category to display, to transmit the displayed data to an external system). In some embodiments, icons 621, 622 may be highlighted or otherwise differentiated from other icons when selected. For example, as shown in FIG. 6, icon 622 is shown as being filled-in (e.g., solid) when selected.

Figure 7:
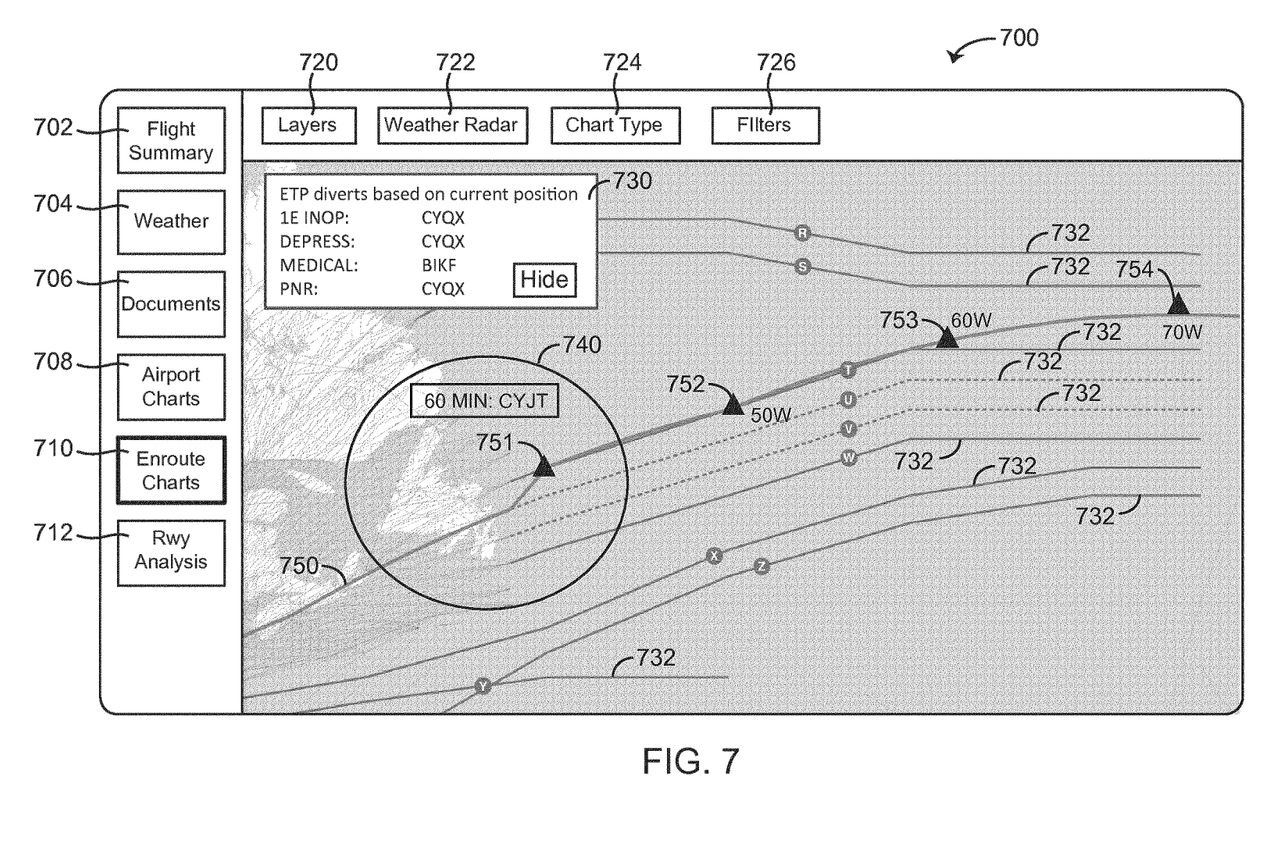
FIG. 7 is an illustration of a display screen of the interactive record keeping system, according to an exemplary embodiment.

Referring now to FIG. 7, an illustration of a display screen 700 of the interactive record keeping system 300 is shown, according to another exemplary embodiment. As shown, the display screen 700 comprises a graphical view of the aircraft's flight plan. In some embodiments, the display screen 700 may include information options displayed on a display status bar, such as icons for adding or displaying layers 720, weather radar 722, filters 726, and/or for changing the chart type 724. When selected, the information options may provide a user with options to customize the display screen 700. For example, a user may add or remove layers to the display screen 700, which may include an ability to turn various features "on" or "off" (e.g., displayed or not displayed, overlaid or not overlaid, and so on) and an ability to request various graphical products, such as a graphical weather product, an air traffic control product, a navigation product, and so on.

In some embodiments, the display screen 700 may include a display option bar that includes a plurality of display options and communication features related to aircraft flight, navigation, record keeping, and safety. For example, in one embodiment, a user may have options to display and/or request information regarding a flight summary 701, weather 704, documents 706, airport charts 708, enroute charts 710, and/or runway analysis 712, among others. When selected, a particular option on the display option bar and/or status bar may be highlighted, filled in, or otherwise differentiated from other options to indicate that the particular option is selected. For example, as shown, the display screen 700 comprises a display of enroute charts 710, as indicated by enroute charts 710 being outlined in bold. In some embodiments, the flight summary 702 may include a tabular display screen comprising a table of aviation data, including data relating to a flight level, temperature, speed, and time. The flight summary 702 may comprise a display screen similar to or the same the display screen 500 of FIG. 5 and/or the display screen 600 of FIG. 6.

In some embodiments, the display screen 700 includes different information types that may be displayed or not displayed based on which layers a user selects to be displayed. For example, as shown, the display screen 700 includes an ETP Diverts Indicator 730, an ETOPS area of operation indicator 740, a plurality of potential flight routes 732, a current flight route 750, and a plurality of waypoint locations along the current flight route 750, including a first waypoint location 751, a second waypoint location 752, a third waypoint location 753, and a fourth waypoint location 754. In some embodiments, the plurality of waypoint locations may be identified by an airport identifier (e.g., CYJT) and/or a latitude and/or longitude indicator (e.g., 50 W, 60 W, 70 W). In some embodiments, the plurality of potential flight routes 732 may include an identifier (e.g., R, S, T, U, V, W, X, Y, Z). In some embodiments, the plurality of potential flight routes 732 may comprise flight routes determined by an air traffic control service. As shown on the display screen 700, the plurality of potential flight routes 732 are shown as a set of North Atlantic Tracks for a particular day for flights traveling eastward across the Atlantic ocean. In some embodiments, the ETOPS area of operation indicator 740 signifies the area in which ETOPS rules apply. For example, as shown on the display screen 700, ETOPS rules apply within the area encompassed by the ETOPS area of operation indicator 740, which further indicates that the area encompassed by the ETOPS area of operation indicator 740 comprises an area equal to about 60 minutes of flight time from a particular airport.

In some embodiments, the ETP Diverts Indicator 730 displays alternate airports for the aircraft to divert to in case of emergency events. For example, as shown, the ETP Diverts Indicator 730 may display an alternate airport to divert to in case one engine become inoperable ("1E INOP"), an alternate airport to divert to in case the aircraft's cabin becomes depressurized ("DEPRESS"), and/or an alternate airport to divert to in case of a medical emergency ("MEDICAL"). For example, if a passenger onboard an aircraft has a heart attack or experiences another emergency medical ailment, the pilot of the aircraft may refer to the ETP Diverts Indicator 730 for an appropriate alternate airport to land at for medical emergencies. In some embodiments, the appropriate airport to land at for medical emergencies may be the closest airport to the aircraft or an airport that is further away but has a particular type of medical facility (e.g., a level three trauma center). In some embodiments, the same airport may serve as the alternate airport for multiple emergency events. In some embodiments, the ETP Diverts Indicator 730 may include a point of no return ("PNR"), which may signify the point at which an aircraft will no longer have enough fuel to return to the aircraft's departure airport. In some embodiments, the pilot or aircraft crew member may select an alternate airport from the ETP Diverts Indicator 730 to generate a new flight route to the selected alternate airport.

Figure 8:
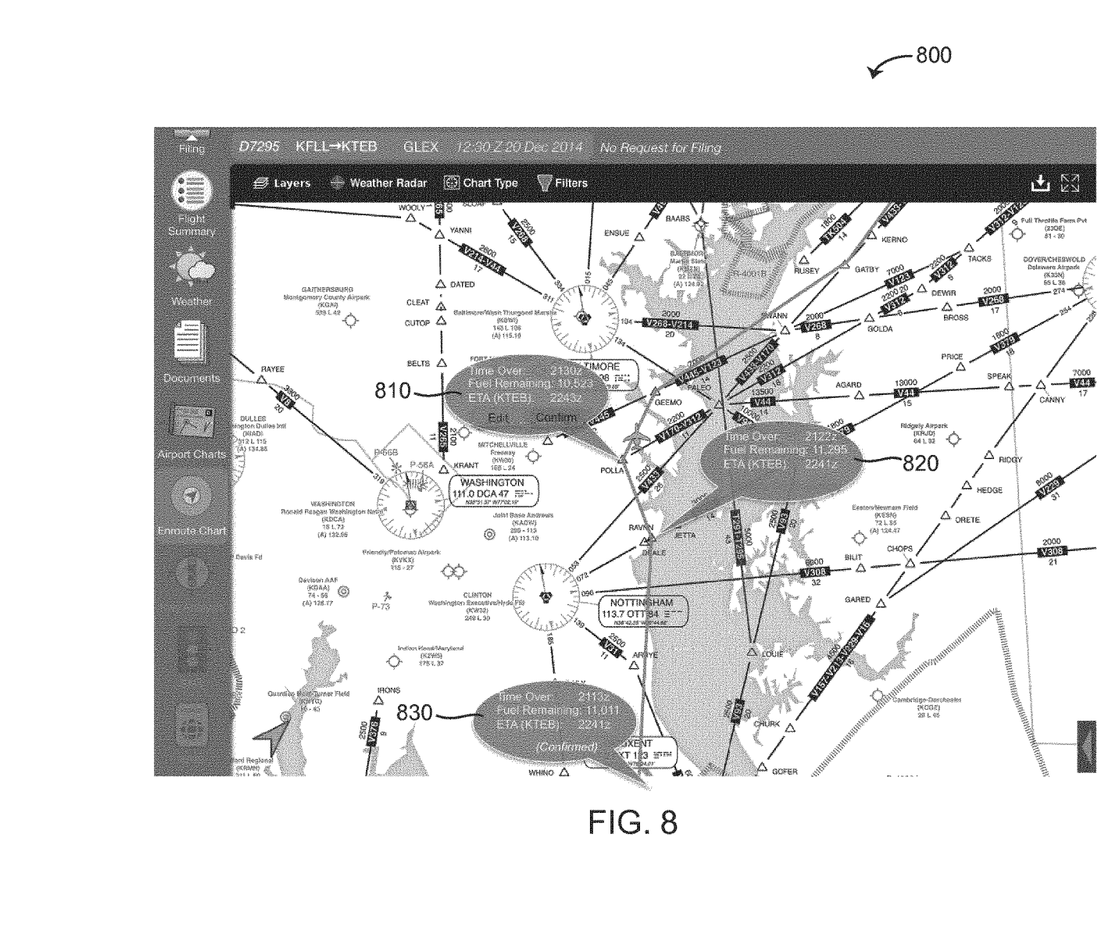
FIG. 8 is an illustration of a display screen of the interactive record keeping system, according to an exemplary embodiment.

Referring now to FIG. 8, an illustration of a display screen 800 of the interactive record keeping system 300 is shown, according to another exemplary embodiment. As shown, the display screen 800 may include a graphical representation of flight information and a plurality of popup indicators, including a first popup 810, a second popup 820, and a third popup 830. Other aspects of the display screen 800, such as status and menu bars, may be the same as or similar to the display screens shown and described in FIGS. 5-7. The plurality of popup indicators may signify aviation events. A popup indicator of the plurality of popup indicators may indicate that the aircraft is currently passing through a waypoint location, is approaching a waypoint location, or that the aircraft has already passed through the waypoint location. As shown, the first waypoint indicator 810 provides the time over, fuel remaining, and the estimated time of arrival at the final destination ("ETA (KTEB)"). In some embodiments, the first waypoint indicator 810 appears once the aircraft has passed through a related waypoint and prompts the pilot or aircraft crew member to either confirm the displayed data or to the edit the displayed data. Upon confirming that the displayed data is accurate, the first waypoint indicator 810 may indicate that the data has indeed been confirmed by displaying a confirmation (e.g., "confirmed"). In some embodiments, the plurality of popup indicators remain on the display screen 800 for the entirety of the flight. In some embodiments, the plurality of popup indicators may remain on the display screen 800 only for a set time, a distance flown, or until a number of successive waypoint locations have been passed through.

Figure 9:
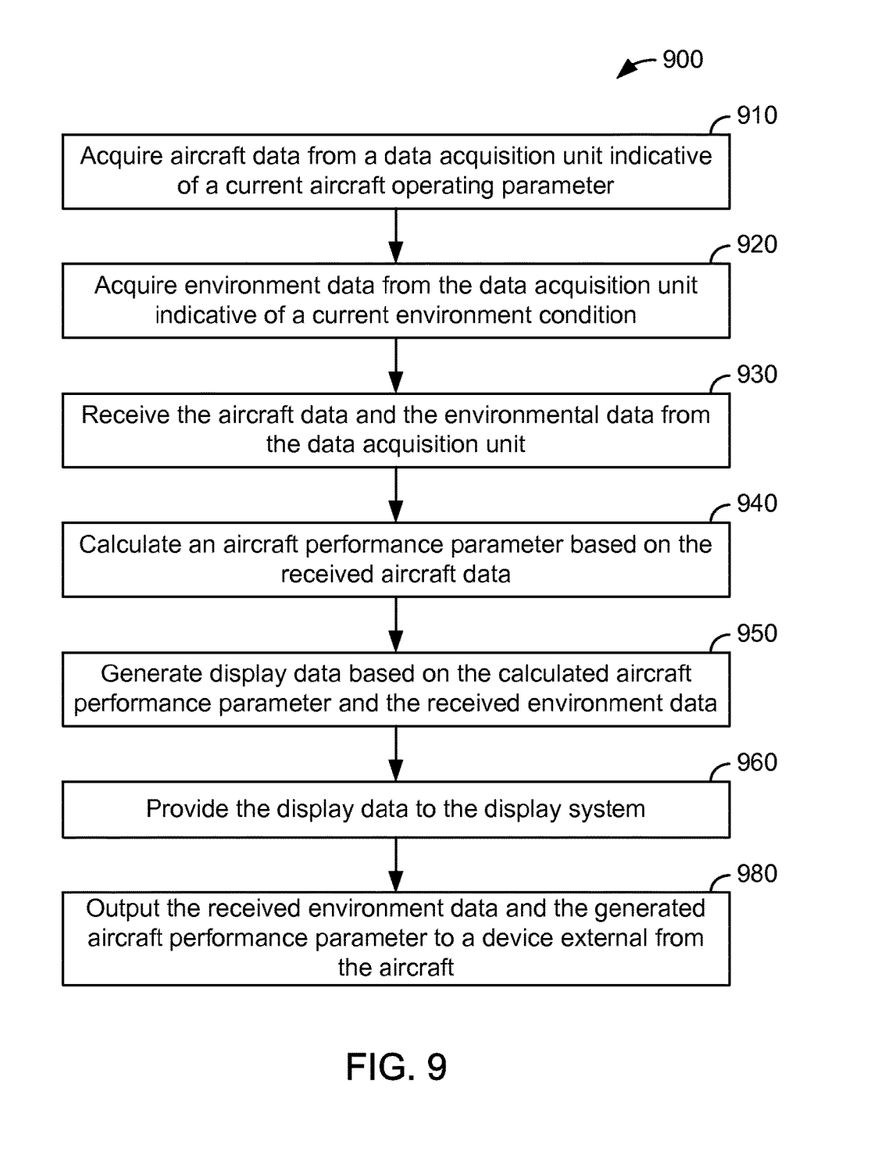
FIG. 9 is a flow diagram of a process for providing an output from the interactive record keeping system, according to an exemplary embodiment.

Referring now to FIG. 9, a flow diagram of a process 900 for providing an output from the interactive record keeping system 300 is shown, according to an exemplary embodiment. The process 900 includes acquiring aircraft data from a data acquisition unit indicative of a current aircraft operating parameter (910). For example, an amount of fuel remaining onboard the aircraft may be acquired using a fuel sensor. The process 900 further includes acquiring environmental data from the data acquisition unit indicative of a current environmental condition (920). For example, a wind speed value may be acquired by a wind speed sensor, such as a pitot tube located on the outside of the aircraft. The aircraft data and the environmental data are associated with a waypoint location of an aircraft. The process 900 further includes receiving the aircraft data and the environmental data from the data acquisition unit (930). The process 900 further includes calculating an aircraft performance parameter based on the received aircraft data (940). For example, an accumulated fuel burn may be determined based on data received from the fuel sensor. The process 900 further includes generating display data based on the calculated aircraft performance parameter and the received environmental data (950). The process 900 further includes providing the display data to the display system (960). For example, the display data may be displayed on the flight displays 20 or other display system. The process 900 further includes outputting the received environmental data and the generated aircraft performance parameter to a device external from the aircraft (980). For example, the received environmental data and the generated aircraft performance data may be send via datalink to a ground-based terrestrial station in real time, after landing, and/or upon docking at an airport terminal.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on machine-readable media capable of accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a special purpose computer or other special purpose machine with a processor. By way of example, such machine-readable storage media may include RAM, ROM, EPROM, EEPROM, CD ROM or other optical disk storage, magnetic disk storage or other magnetic storage devices, or any other medium which may be used to carry or store desired program code in the form of machine-executable instructions or data structures and which may be accessed by a special purpose computer or other special purpose machine with a processor. Combinations of the above are also included within the scope of machine-readable storage media. Machine-executable instructions include, for example, instructions and data which cause a special purpose computer or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, and so on, that perform particular tasks or implement particular data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments may use computer networks, intranets, and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device in the form of a special purpose computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts and diagrams provided herein may show a specific order of method steps, it is understood that the order of these steps may differ from what is depicted. Also two or more steps may be performed concurrently or with partial concurrence. Such variation may depend on the software and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. An interactive record keeping system, comprising:
a display system;
a user input device configured to receive a user input;
an input-output interface; and
a controller coupled with the input-output interface and comprising at least one processor coupled with a non-transitory processor-readable medium, the controller configured to:
  receive user input data from the user input device, the user input data indicative of a user display preference and a plurality of known waypoint locations, the known waypoint locations partially defining a planned flight path of an aircraft, wherein a subset of the known waypoint locations comprise reporting waypoint locations, an reporting waypoint locations being specified prior to takeoff and defining locations along the planned flight path of the aircraft where specific aircraft performance parameters are to be calculated and displayed;
  receive aircraft data and environmental data from the input-output interface when the aircraft passes over the known waypoint locations, the aircraft data indicative of a current aircraft operating parameter of the aircraft when the aircraft passes over the known waypoint locations, the environmental data indicative of a current environmental condition at the known waypoint locations when the aircraft passes over the known waypoint locations, and associating the aircraft data and the environmental data with the known waypoint locations;
  calculate an aircraft performance parameter based on the received aircraft data, the calculated performance parameter associated with performance of the aircraft when the aircraft passes over a reporting waypoint location;
  generate display data based on the calculated aircraft performance parameter, the received environmental data, and the user display preference, the display data indicative of the current environmental condition and the aircraft performance parameter for the reporting waypoint locations;
  provide the display data to the display system; and store the calculated aircraft performance parameter and the environmental data in a memory.

2. The interactive record keeping system of claim 1, wherein the input-output interface is configured to receive data from or output data to at least one of an aircraft communications system and an aircraft operation sensor.

3. The interactive record keeping system of claim 1, wherein the known waypoint locations are predetermined prior to the aircraft taking off and at least partially define an intended course of flight, and wherein the controller is further configured to adjust the intended course of flight to an actual course of flight based on receiving a navigation update.

4. The interactive record keeping system of claim 1, wherein the known waypoint locations comprise a compulsory reporting point.

5. The interactive record keeping system of claim 1, wherein the received environmental data and the aircraft performance parameter are configured to be output to a device external from the aircraft.

6. The interactive record keeping system of claim 1, wherein the display system is configured to initially display at least one estimated aircraft performance parameter and at least one estimated environmental condition, and wherein the display data provided to the display system causes the initially displayed at least one estimated aircraft performance parameter and estimated environmental condition to be adjusted.

7. The interactive record keeping system of claim 1, wherein the controller is further configured to provide an alert at each reporting waypoint location based on at least one of the aircraft performance parameter and the environmental condition, wherein the alert prompts an aircraft crew member to manually confirm that the displayed data is accurate, and wherein the display system indicates a status of the display data, the status indicating the data being one of confirmed or not yet confirmed.

8. The interactive record keeping system of claim 7, wherein the alert is based on at least one of an amount of fuel remaining, a distance to a final intended destination, an aircraft speed, and an aircraft flight level.

9. A method, comprising:
receiving user input data from a user input device, the user input data indicative of a user display preference and a plurality of known waypoint locations, the known waypoint locations partially defining a planned flight path of the aircraft, wherein a subset of the known waypoint locations comprise reporting waypoint locations, the reporting waypoint locations being specified prior to takeoff and defining locations along the planned flight path of the aircraft where specific aircraft performance parameters are to be calculated and displayed;
receiving aircraft data and environmental data from an input-output interface when the aircraft passes over the known waypoint locations, the aircraft data indicative of a current aircraft operating parameter of the aircraft when the aircraft passes over the known waypoint locations, the environmental data indicative of a current environmental condition at the known waypoint locations when the aircraft passes over the known waypoint locations, and associating the aircraft data and the environmental data with the known waypoint locations;
calculating an aircraft performance parameter based on the received aircraft data, the calculated performance parameter associated with performance of the aircraft when the aircraft passes over a reporting waypoint location;
generating display data based on the calculated aircraft performance parameter, the received environmental data, and the user display preference, the display data indicative of the current environmental condition and the aircraft performance parameter for the reporting waypoint locations;
providing the display data to a display system; and
storing the calculated aircraft performance parameter and the environmental data in a memory.

10. The method of claim 9, wherein the input-output interface is configured to receive data from or output data to at least one of an aircraft communications system and an aircraft operation sensor.

11. The method of claim 9, wherein the known waypoint locations are predetermined prior to the aircraft taking off and at least partially define an intended course of flight, and wherein the intended course of flight is adjusted to reflect an actual course of flight based on receiving a navigation update.

12. The method of claim 11, wherein the known waypoint locations comprise a compulsory reporting point.

13. The method of claim 9, wherein the received environmental data and the aircraft performance parameter are configured to be output to a device external from the aircraft.

14. The method of claim 9, further comprising initially displaying at least one estimated aircraft performance parameter and at least one estimated environmental condition, and causing the initially displayed at least one estimated aircraft performance parameter and the at least one estimated environmental condition to be adjusted.

15. The method of claim 9, further comprising providing an alert in a cockpit of an aircraft at each reporting waypoint location based on at least one of the aircraft performance parameter and the environmental condition, wherein the alert prompts an aircraft crew member to manually confirm that the displayed data is accurate, and wherein the display system indicates a status of the display data, the status indicating the data being one of confirmed or not yet confirmed.

16. The method of claim 15, wherein the alert is based on at least one of an amount of fuel remaining, a distance to a final intended destination, an aircraft speed, an aircraft flight level, a temperature near the aircraft, and a wind speed near the aircraft.

17. A flight planning system, comprising:
a touchscreen display configured to display data and receive a user input;
an input-output interface; and
a controller coupled with the input-output interface and comprising at least one processor coupled with a non-transitory processor-readable medium, the controller configured to:
receive user input data from the touchscreen display, the user input data indicative of a user display preference and a plurality of known waypoint locations, the known waypoint locations partially defining a planned flight path of an aircraft, wherein a subset of the known waypoint locations comprise reporting waypoint locations, the reporting waypoint locations being specified prior to takeoff and defining locations along the planned flight path of the aircraft where specific aircraft performance parameters are to be calculated and displayed;

receive aircraft data and environmental data from the input-output interface when the aircraft passes over the known waypoint locations, the aircraft data indicative of a current aircraft operating parameter of the aircraft when the aircraft passes over the known waypoint locations, the environmental data indicative of a current environmental condition at the known waypoint locations when the aircraft passes over the known waypoint locations, and associating the aircraft data and the environmental data with the known waypoint locations;

calculate an aircraft performance parameter based on the received aircraft data, the calculated performance parameter associated with performance of the aircraft when the aircraft passes over a reporting waypoint location;

generate display data based on the calculated aircraft performance parameter, the received environmental data, and the user display preference, the display data indicative of the current environmental condition and the aircraft performance parameter for the reporting waypoint locations;

generate an alert based on at least one of the calculated aircraft performance parameter and the environmental condition;

provide the display data to the touchscreen display;

provide the alert in a cockpit of an aircraft, wherein the alert provides an indication to a pilot of the aircraft to take an action; and store the calculated aircraft performance parameter and the environmental data in a memory.

18. The flight planning system of claim 17, wherein the action includes at least one of confirming that the display data is accurate and performing an aircraft maneuver.

19. The flight planning system of claim 18, wherein the aircraft maneuver comprises diverting to an alternate airport, and wherein the alternate airport is an airport other than an intended destination.

20. The flight planning system of claim 18, wherein confirming that the display data is accurate comprises selecting at least one displayed aircraft performance parameter and using the touchscreen display to enter a corrected aircraft performance parameter.

* * * * *